(12) United States Patent
Hatch

(10) Patent No.: US 6,607,826 B1
(45) Date of Patent: Aug. 19, 2003

(54) PLASTIC ANTI-FOULING FILM FOR BOAT HULL PROTECTION

(75) Inventor: Edwin Burton Hatch, West Bend, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/457,979

(22) Filed: Dec. 9, 1999

(51) Int. Cl.⁷ .......................... B32B 15/04; B63B 59/04
(52) U.S. Cl. ................. 428/343; 428/40.1; 428/40.2; 428/40.7; 428/41.3; 428/41.4; 428/41.5; 428/41.7; 428/42.2; 428/42.3; 428/76; 428/142; 428/144; 428/344; 428/346; 428/347; 428/352; 428/355 RA; 428/904; 106/15.05; 106/18.32
(58) Field of Search ................. 428/40.1, 40.2, 428/40.7, 41.3, 41.4, 41.5, 41.7, 42.2, 42.3, 76, 142, 143, 144, 343, 344, 346, 347, 352, 907, 355 RA; 106/15.05, 18.32

(56) References Cited

U.S. PATENT DOCUMENTS

| | | | | |
|---|---|---|---|---|
| 4,035,546 A | * | 7/1977 | Ruppert, Jr. ................ 428/332 |
| 4,082,588 A | | 4/1978 | Anderton et al. ............ 156/71 |
| 4,273,833 A | | 6/1981 | De Long ..................... 428/411 |
| RE30,771 E | | 10/1981 | Zondek ....................... 156/196 |
| 4,923,730 A | * | 5/1990 | Taniguchi et al. ............ 428/92 |
| 5,080,926 A | | 1/1992 | Porter et al. ................. 427/34 |
| 5,143,545 A | | 9/1992 | Stiffey et al. ............. 106/15.05 |
| 5,221,331 A | | 6/1993 | Ikari et al. ................ 106/18.33 |
| 5,248,221 A | | 9/1993 | Gerhart et al. .............. 405/216 |
| 5,259,701 A | | 11/1993 | Gerhart et al. .............. 405/216 |
| 5,397,385 A | * | 3/1995 | Watts ....................... 106/18.32 |
| 5,571,312 A | * | 11/1996 | Andoe ...................... 106/18.32 |
| 5,814,172 A | * | 9/1998 | Cox et al. ..................... 156/71 |

OTHER PUBLICATIONS

Berrien, "Current Events—Powerful Tips on Ground–Fault Interrupters, Batteries, and More", *Boating Magazine,* Mar. 1991.

* cited by examiner

*Primary Examiner*—Terrel Morris
*Assistant Examiner*—Arti Singh
(74) *Attorney, Agent, or Firm*—Andrus, Sceales, Starke & Sawall, LLP

(57) ABSTRACT

A protective layer which prevents marine fouling when attached to a boat hull or other structure intended to be submerged underwater. The protective layer achieves its anti-fouling characteristic by incorporating anti-fouling compounds uniformly dispersed throughout either a plastic film or an adhesive used to bond the film to a surface to be protected which slowly leach into the surrounding marine environment. The film is removably adhered to a boat hull or other structure by a thermally sensitive thermoplastic adhesive. The film may be removed by simply reheating until the adhesive softens to thereby allow the film and any undesired marine organisms attached thereon to be peeled away from the boat hull.

23 Claims, 2 Drawing Sheets

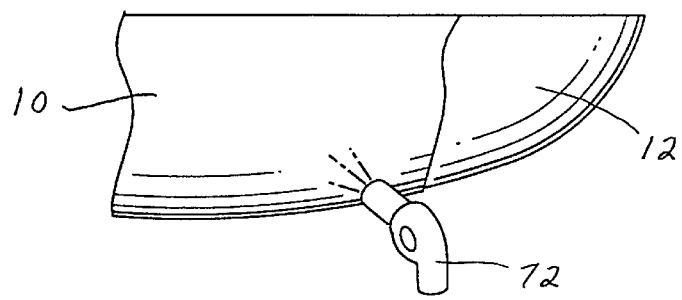
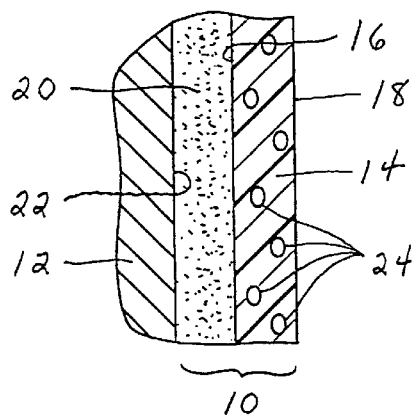
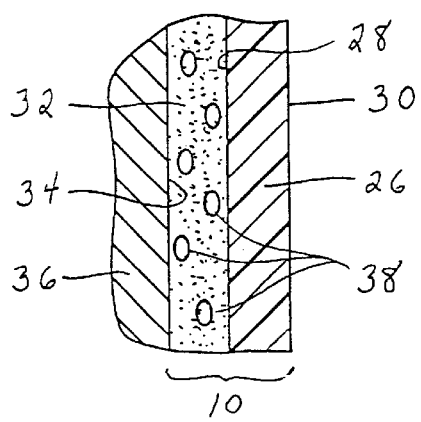
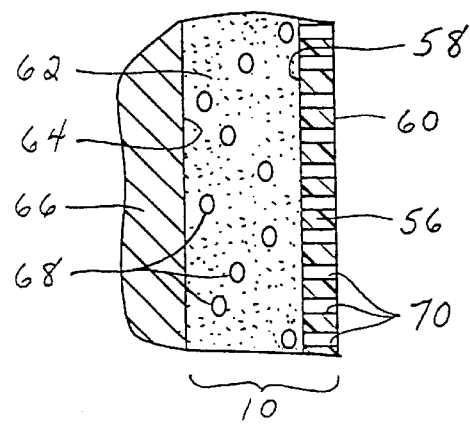

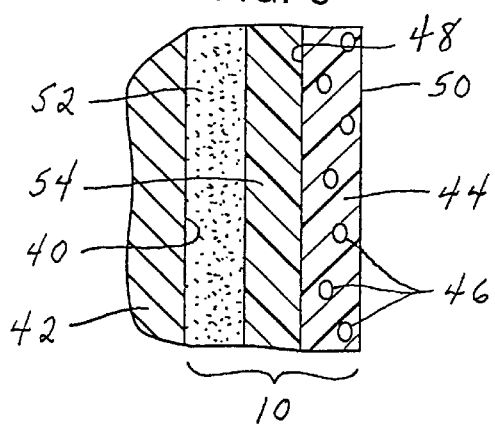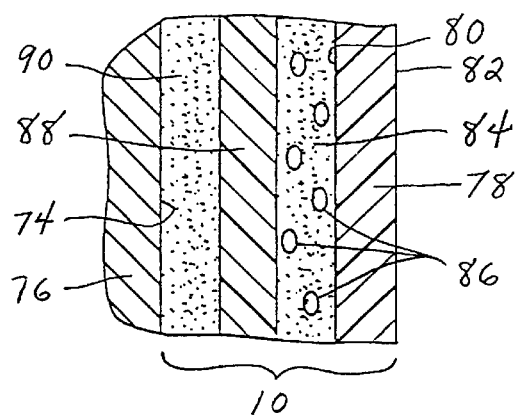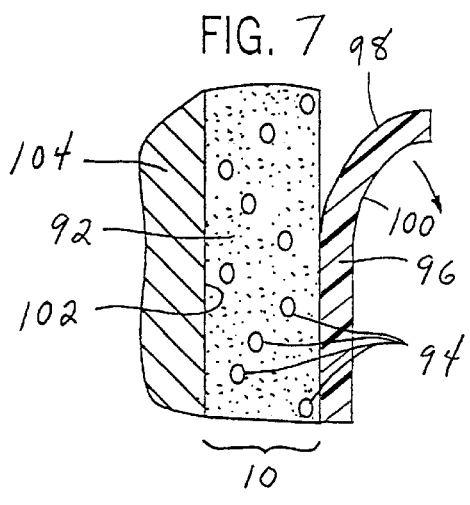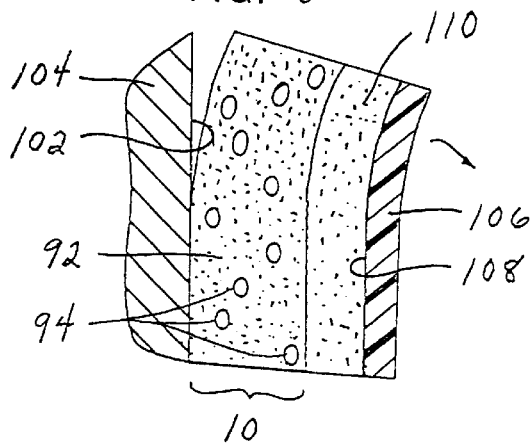

PLASTIC ANTI-FOULING FILM FOR BOAT HULL PROTECTION

FIELD OF THE INVENTION

This invention relates to anti-fouling materials for inhibiting marine growth on submerged articles, particularly boat hulls. Specifically, this invention utilizes a plastic anti-fouling film for controlling the growth of algae, barnacles, mussels, fungi and other marine organisms on a boat hull in salt and/or fresh water.

BACKGROUND OF THE INVENTION

The growth of algae, fungi, barnacles, mussels and other marine organisms on submerged structures, such as boat hulls, is referred to as marine "fouling" and results in rough, biologically encrusted surfaces. Marine fouling of boat hulls causes many problems such as fuel waste, difficulty of boat steering and maneuvering due to increased drag, as well as damage to the boat hull itself. The rougher the hull, the more fuel the boat requires to maintain its speed through water. It is estimated that fuel savings alone could amount to several hundred million dollars annually through the use of anti-fouling techniques.

The rapid growth of marine organisms on underwater surfaces has long been a problem in the marine industry. Various chemically treated anti-fouling paints have traditionally been used to combat this kind of unwanted growth However, many of the chemicals incorporated with anti-fouling paints have been found to be toxic to non-target organisms, thereby mandating severe restrictions as to the use and application of such chemicals.

Anti-fouling paints have a myriad of problems associated with their use. For example, as anti-fouling paint ages, toxic chemicals leach out of the paint and the paint subsequently becomes a less effective deterrent to marine growth and must be replaced. Anti-fouling paint coatings are typically about 1.5 mm thick and thus need to be replaced annually in harsh salt water environments such as those around Florida and California. Before the old anti-fouling paint can be sanded or scraped off the hull, however, it is often necessary to scrape off the plentiful growth of barnacles, mussels, and any other marine organisms which have accumulated due to the decreased effectiveness of the paint over time. The removal of these organisms is quite time consuming and extremely laborious due to these organism's great adhesive strength. The boat hull must then be repainted with a fresh coat of anti-fouling paint.

A major drawback of this tedious work is that these anti-fouling paints contain ingredients that are highly toxic not only to barnacles and other marine growth, but also to the individuals applying the paint and subsequently removing it years later. The effect of paint dust or particles on the worker's health has thus become an important issue and a major concern associated with anti-fouling paints.

Anti-fouling paints also pose environmental hazards. Overspray during application, water run-off occurring during paint removal, and disposal of paint waste must be closely monitored and controlled to avoid long term environmental and ground water pollution.

Another disadvantage is that these anti-fouling paints are extremely expensive due to special precautions that need to be taken in their application, removal and disposal. In Florida, for instance, individuals must drape plastic tarps under and around a boat hull to catch the ground-off paint dust, new paint overspray and drippings. These tarps must then be bagged and specially marked as hazardous materials and shipped off site to a proper, pre-approved disposal location. Due to such special handling, extra shipping precautions and added disposal requirements, these anti-fouling paints are expensive to utilize.

A common anti-foulant ingredient utilized in these paints is copper and copper based compounds. The major disadvantage of copper based paint is that it can cause galvanic corrosion of aluminum vessels. Even with high quality anti-corrosive primers, flaws in the primer coat may result in corrosion of an aluminum hull, especially those with extended periods between dry dockings. Therefore, copper based anti-foulant paints are impractical for aluminum boats.

Another anti-fouling compound is tributyltin (TBT). Currently, owners of aluminum based boats use tributyltin based paints to inhibit marine fouling. A common TBT compound utilized is tributyltin methacrylate. Although use of TBT avoids the corrosive effects of copper on aluminum, paints utilizing TBT still retain all of the disadvantages of anti-fouling paint previously mentioned.

Due to the problems associated with anti-fouling paints, other anti-fouling techniques have been utilized, albeit with very limited success. For example, another anti-fouling method used is to "plant" a multiplicity of filaments on the surface of the boat hull or marine structure. The filaments flutter in the seawater so as to effectively prevent marine growth. However, it has been found that filaments which are fine enough to ensure sufficient fluttering to inhibit marine growth tend to get deformed, damaged, and entangled with one another in a short period. This results in the impairment of the fluttering characteristic, which in turn reduces the anti-fouling effect of the filaments.

SUMMARY OF THE INVENTION

The present invention provides an anti-fouling protective layer for preventing attachment of marine organisms to an underwater surface. More specifically, the anti-fouling protective layer comprises a plastic film having inner and outer surfaces, and a thermoplastic adhesive disposed between a structure intended to be submerged underwater and the inner surface of the film, said adhesive being of the type that upon heating removably adheres the film to the underwater surface of said structure. Either the plastic film or the thermoplastic adhesive is impregnated with an anti-fouling compound so that when attached to said structure, the anti-fouling compound prevents growth of marine organisms on the plastic film.

In one form, the plastic film is impregnated with an anti-fouling compound so as to prevent marine organisms from attaching to the plastic film. A hygroscopic plastic film may best allow a slow release of the anti-fouling compound into the surrounding aqueous environment and thus prevent the growth of marine organisms on the film.

In another embodiment, the thermoplastic adhesive is impregnated with the anti-fouling compound. In this embodiment, the outer plastic film must be permeable to allow release of the anti-fouling compound and prevent the growth of marine organisms on the outer plastic film.

Preferably, the outer plastic film includes a plurality of minute openings formed therethrough to allow the slow release of said anti-fouling compounds.

In yet another embodiment, an insulating film is disposed between the substrate containing the anti-fouling compound and the underwater surface. The insulating film is used to provide a barrier to prevent corrosion of the submerged structure by the anti-fouling compound. This embodiment would typically be utilized if a copper based anti-foulant ingredient was utilized on an aluminum boat hull. Preferably, the insulating film would be coextruded with the plastic film which is impregnated with the anti-fouling compound so as to be located between the plastic film and the adhesive. Alternately, the insulating film could be located between the adhesive layer and the surface to be protected if the adhesive layer is the substrate impregnated with the anti-fouling compound.

Preferably, the anti-fouling film has the heat sensitive thermoplastic adhesive pre-applied to its inner surface for ease of handling, but the film and adhesive may be separate components if desired. The film may be applied to a structure such as a boat hull by stretching the film over the hull and preferably taping it in place. Utilizing a heat gun and roller, the film and adhesive is heated, rolled onto the hull surface, and then allowed to cool. The anti-fouling film is thus adhesively bonded to the hull and will remain bonded until later removed. To replace old film, the film and adhesive is re-heated to soften the adhesive. The film is then stripped from the hull along with any barnacles, mussels and other marine growth which may be attached to the film. This eliminates the need for scraping organisms off the hull since they are simply removed when peeling off the film. This invention thus reduces the time and effort associated with removing marine growth directly from the boat hull. The invention also advantageously leaves no dust, overspray or toxic particles in the environment upon removal of the film. The used film may be placed in a plastic bag after removal for proper disposal or can be sent to a manufacturer for re-fabricating or recycling. A new plastic anti-fouling film can then be applied.

In still another embodiment, a laminate comprising a plastic film and a first adhesive impregnated with the anti-fouling compound is applied to the underwater surface of the structure. However, in this embodiment, the plastic film is peeled off of the first adhesive after application to the structure, leaving only the first adhesive containing the anti-fouling compound in direct contact with the outside environment. The first adhesive is removed after the anti-fouling agent has lost effectiveness by applying a removing laminate comprised of a carrier film and a second adhesive over the first adhesive, heating the carrier film and first and second adhesives to soften and bond the first adhesive to the second adhesive, and peeling off the carrier film together with the first adhesive now bonded to the second adhesive.

BRIEF DESCRIPTION OF THE SEVERAL VIEWS OF THE DRAWING

FIG. 1 is a fragmentary schematic view of a boat hull incorporating the anti-fouling layer of the present invention;

FIG. 2 is a fragmentary cross-sectional view of a boat hull to which a plastic film containing the anti-fouling ingredient has been adhesively applied;

FIG. 3 is a view similar to FIG. 2 except illustrating a second embodiment wherein the anti-fouling ingredient is incorporated in the adhesive instead of the film;

FIG. 4 is a view similar to FIG. 3 illustrating a third embodiment of the invention wherein the anti-fouling ingredient is incorporated in the adhesive and the plastic film is permeable;

FIG. 5 is a view similar to FIGS. 2–4 except illustrating a fourth embodiment incorporating an insulating barrier film between the a plastic film containing the anti-fouling ingredient and the adhesive layer bonding the film to a boat hull;

FIG. 6 is a view similar to FIG. 5 except illustrating a fifth embodiment wherein the insulating barrier film is located between the adhesive layer, which is impregnated with the anti-fouling ingredient, and the surface of the boat hull;

FIG. 7 is a view similar to FIGS. 3–4 except illustrating a sixth embodiment wherein only an adhesive layer containing the anti-fouling ingredient is provided; and FIG. 8 is a view illustrating the removal of the adhesive layer of FIG. 7.

DETAILED DESCRIPTION OF THE INVENTION

Referring now to the drawings, FIG. 1 illustrates an anti-fouling protective layer 10 for preventing attachment of marine organisms to a surface of a structure intended to be submerged underwater, such as hull 12 of boat. Specifically, the protective layer 10 may be utilized to control the growth of algae, barnacles, mussels, fungi and other undesirable marine organisms on boat hull 12 and may be utilized in both salt and/or fresh water. Further, it should be noted that although the drawings illustrate the use of protective layer 10 on hull 12 of a boat, protective layer 10 may be utilized to protect other structures intended to be submerged underwater, such as boat hulls, docks, dock floats, buoys and channel markers, and any other structures exposed to marine growth.

Referring now to FIG. 2, protective layer 10 is illustrated as including a plastic film 14 having an inner surface 16 and an outer surface 18 together with a thermoplastic adhesive 20 disposed between outer surface 22 of hull 12 and inner surface 16 of film 14. Adhesive 20 and film 14 may be supplied as separate components and thus sequentially applied to outer surface 22 of hull 12, as will hereinafter be described, but are preferably combined in a single laminate structure so that the film 14 is supplied with adhesive 20 incorporated thereon for ease of handling and application onto hull 12. In this embodiment, an anti-fouling compound 24 is impregnated within film 14 so as to be uniformly dispersed therein. Generally, this can be accomplished during extrusion of film 14 by mixing an appropriate and effective amount of compound 24 into film 14 prior to its extrusion.

Any plastic film 14 that is compatible with anti-fouling compound 24 and has sufficient strength, durability, and flexibility to be applied to a variety of shapes and forms of hull 12 of a boat, may be utilized and is within the scope of the present invention. These films can be selected from the groups comprising ethylene based polymers and copolymers, such as ethylene/vinyl acetate, ethylene acrylate, ethylene methacrylate, ethylene methyl acrylate, ethylene methyl methacrylate, high and low density polyethylene, polyethylene blends and chemically modified polyethylene, copolymers of ethylene and 1–6 mono- or di-unsaturated monomers, polyamides, polybutadiene rubber, polyesters such as polyethylene terephthalate, polybutylene terephthalate; thermnoplastic polycarbonates, atactic poly-alpha-olefins, including atactic polypropylene, and others; thermnoplastic polyacrylamides, polyacrylonitrile, copolymers of acrylonitrile and other monomers such as butadiene styrene; polymethyl pentene, polyphenylene sulfide, aromatic polyurethanes; styrene-acrylonitrile, acrylonitrile-butadiene-styrene, styrene-butadiene rubbers, polyethylene terephthalate, acrylonitrile-butadiene-styrene elastomers, polyphenlene sulfide, A—B, A—B—A, A—(B—A)$_n$—B, (A—B)$_n$—Y block copolymers wherein the A comprises a polyvinyl aromatic block, the B block comprises a rubbery midblock which can be partly hydrogenated, and mixtures of said substances, but other similar materials can be used as well, to match the properties of the adhesive packaged. More specifically, nylon, polyethylene and polypropylene based films are preferred examples of the types of plastic material that may be employed as film 14. It should be noted that it may be necessary to utilize dispersants, stabilizers, or other similar compounds to ensure the anti-fouling compound 24 utilized is uniformly distributed throughout film 14. The plastic film 14 is preferably 6 mils or thicker which enables the film 14 to be easily applied, yet provides significant scratch protection to hull 12. In addition, the film 14 may be transparent which allows it to be used directly over hull 12 of any color, as well as to be applied directly over decals that may already be incorporated onto hull 12. Thus, film 14 can be applied either as original equipment or in the after market.

A wide range of heat activated, thermoplastic adhesive formulations may also be utilized for adhesive layer 20. Adhesive 20 should be strong enough to ensure that if a scratch, tear or rip occurs in film 14, film 14 does not become stripped from hull 12 as hull 12 is propelled through water. Adhesive 20 preferably has a thermno bonding temperature, i.e. the temperature at which the adhesive bonds to outer surface 22 of hull 12, lower than the melting point of plastic film 14. In other words, adhesive 20 should be able to adhere to boat hull 12 or other structure at a temperature such that when applied, plastic film 14 does not melt. Accordingly, plastic film 14 should have a higher melting point than the melting point of adhesive 20.

Thermoplastic base polymers that can be used in the manufacture of the adhesive 20 of the invention are thermoplastic polymers that are sufficiently compatible with tackifier, plasticizer, and other thermoplastic or thermosetting components to formn a substantial homogenous melt and solid. Typically in the adhesive 20 of the invention, the polymer provides mechanical strength and a cohesively competent adhesive bonding mass.

Any of a variety of available thermoplastic materials can be used in the compositions of the invention. Examples of such thermoplastics are ethylene based polymers such as polyethylene and its co- and terpolymers, ethylene/vinyl acetate, ethylene acrylate, ethylene methacrylate, ethylene methyl acrylate, ethylene methyl methacrylate, copolymers of ethylene and 1–6 mono- or di-unsaturated monomers etc., polyamides, polybutadiene rubber, polyesters such as polyethylene terephthalate, polybutylene terepthalate, etc., thermoplastic polycarbonates, atactic poly-alpha-olefins, including atactic polypropylene, and others; thermoplastic polyacrylamides, polyacrylonitrile, copolymers of acrylonitrile and other monomers such as butadiene, styrene, etc., polymethyl pentene, polyphenylene sulfide, aromatic polyurethanes; styrene-acrylonitrile, acrylonitrile-butadiene-styrene, styrene-butadiene rubbers, polyethylene terephthalate, acrylonitrile-butadiene-styrene elastomers, polyphenylene sulfide. Also, A—B, A—B—A, A—(B—A)$_n$—Y block copolymers wherein the A comprises a polyvinyl aromatic block, the B block comprises a rubbery midblock which can be partly hydrogenated, and others can be used.

Preferred polymers for use in the adhesive 20 of this invention comprise EVA, APP, linear A—B—A block, linear A—(B—A)$_n$—B multiblock copolymers, and radial or teleblock copolymers of the formula (A—B)—$_n$—y wherein A comprises a polystyrene block, B comprises a substantially rubbery polybutadiene or polyisoprene block, Y comprises a multivalent compound, and n is an integer of at least 3. The midblocks can be post-treated to improve their heat stability through hydrogenation or other post-treatment removing residual unsaturation.

The adhesive layer 20 of the invention can also contain other compatible polymers, plasticizers, tackifying, resin fillers, pigments, dyes, oils, catalysts, inhibitors, antioxidants, UV absorbers, waxes, and other conventional additives. A preferred adhesive is an adhesive such as Bostick 7064 available from Bostick. This adhesive has a melting point of approximately 250° F. Preferably, this adhesive would be utilized with a nylon film which has a melting point of approximately 350° F. which is well above the adhesive's melting point.

Hot melt adhesives can also be utilized as adhesive 20. Briefly, thermoplastic synthetic resin materials used in hot melt adhesives comprise a variety of polymerized material. These polymers are blended with other ingredients such as plasticizers, tackifiers and extenders, to formn an adhesive. Such polymers include polyethylene, polypropylene, polyvinyl acetate, polyvinyl butyral, polyvinylalcohol, ethylene-vinylalcohol polymers and other polyvinyl resins; polystyrene resins, A—B—A block copolymers comprising polymers wherein A is a polystyrene block and B is a rubbery midblock section; acrylic and methacrylic acid ester resins; various other materials compounded from synthetic resins such as polyisobutylene, polyamides, cumarone-indene products and silicones. Such thermoplastic resins usually have permanent solubility and fusability so that when hot, they can flow or creep under stress and soften to some extent to form a bond. After cooling, the materials preferably resist creep and bond deformation. Tfhey are used in the manufacture of tape, safety glass, shoe cements, for the bonding or lamination of film, foil or non-woven laminates, metals, woods, rubber, paper and many other materials. The aforementioned hot melt adhesives are well known in the art, and are readily commnercially available.

Any of the known anti-fouling compounds can be utilized in the protective layer 10. The only criteria is that such compounds are compatible with film 14, and are effective to control the growth of algae, barnacles, mussels, fungi and other marine organisms. Typical examples of anti-fouling compounds includes furan based compounds, copper compounds, lactone compounds, capsaicin or capsicum compounds, polyurethanes, peppercorn derivatives, alkyl-phenols derivatives, antibiotics (such as chloramphenicol, erythromycin, neomycin, and streptomycin), TBT, organotin polymers, and any compound which can effectively inhibit marine growth and be effectively dispersed throughout a plastic film. The aforementioned compounds are well known anti-fouling compounds, and are readily commercially available.

Referring now to FIG. 3, there is illustrated a second embodiment of the protective layer 10. In this embodiment, protective layer 10 once again includes a plastic film 26 having an inner surface 28 and an outer surface 30, as well as an adhesive layer 32 disposed between inner surface 28 of film 26 and outer surface 34 of hull 36. In this embodiment, however, anti-fouling compound 38 is impregnated in adhesive 32. As a result, anti-fouling compound 38 dispersed in adhesive 32 may slowly leach out into the surrounding environment through film 26 and thus prevent the growth and/or attachment of undesirable marine organisms to film 26. Thus, film 26 provides a slow release of anti-fouling compound 38 from adhesive 32 in order to repel mussels, barnacles and the like.

FIG. 4 illustrates a third embodiment for protective layer 10 which comprises a plastic film 56 having an inner surface 58 and an outer surface 60 together with an adhesive layer 62 disposed between inner surface 58 and outer surface 64 of boat hull 66. In this embodiment, anti-fouling compound 68 is uniformly dispersed within adhesive layer 62 as in the embodiment of FIG. 3. However, in this embodiment, film 56 is impervious to water. Therefore, in order to permit anti-fouling compound 68 to inhibit growth of marine organisms on outer surface 60 of film 56, it is necessary that film 56 be permeable. In order to accomplish this, film 56 includes a plurality of openings 70 formed therethrough. Openings 70 enable compound 68 to pass through film 56 and function to prevent marine growth and/or attachment of marine organisms to film 56.

Referring now to FIG. 5. there is illustrated a fourth embodiment for protective layer 10. In this embodiment, protective layer 10 is employed and applied to outer surface 40 of an aluminum hull 42. As with the first embodiment shown in FIG. 2, this embodiment employs a plastic film 44 impregnated with anti-fouling compound 46, having an inner surface 48 and an outer surface 50 together with an adhesive layer 52 for removably attaching protective layer 10 to surface 40 of hull 42. In this embodiment, however, an insulating film 54 is employed as a barrier to prevent corrosion of aluminum hull 42 caused by anti-fouling compound 46. As illustrated, insulating film 54 is disposed between inner surface 48 of plastic film 44 and adhesive layer 52. Insulating film 54 is preferably composed of either polyethylene or polypropylene. However, film 54 can be composed of any material whidch effectively prevents anti-foulant 46 from causing corrosion of hull 42. Preferably, insulating film 54 and outer plastic film 44, are coextruded to formn an integral laminate structure for ease of handling and application. Many different plastic film s, as earlier described, may be utilized due to the existence of compatabilizers, which are complex chemical compounds used to co-extrude and thus laminate plastic films that are normally incompatible.

The film 14, 26, 44 or 56 may be applied to boat hull 12 by stretching the film over hull 12 and preferably taping it in place. Then, utilizing a heat gun 72 and roller (not shown), the film and adhesive is heated, rolled onto the boat hull's surface, and then allowed to cool. The film and adhesive is thus bonded to the surface of hull 12 and will remain bonded until later removed. To replace old film and adhesive, the film and adhesive is re-heated to soften the adhesive. The film and adhesive is then stripped from hull 12 along with any barnacles, mussels and other marine growth which happens to be attached to the film.

FIG. 6 illustrates a fifth embodiment for protective layer 10. In this embodiment, protective layer 10 is again employed and applied to outer surface 74 of an aluminum hull 76. As with the second embodiment shown in FIG. 3, this embodiment employs a plastic film 78 having an inner surface 80 and an outer surface 82 together with an adhesive layer 84 impregnated with anti-fouling compound 86. In this embodiment, an insulating film 88 is employed as a barrier to prevent corrosion of aluminum hull 76 caused by anti-fouling compound 86, and is disposed between adhesive layer 84 and the outer surface 74 of hull 76. An adhesive layer 90 is employed to bond insulating film 88 to the outer surface 74 of hull 76. As with the embodiment of FIG. 5, insulating film 88 is preferably composed of either polyethylene or polypropylene, but may be composed of any material which effectively prevents anti-fouling compound 86 from causing corrosion of hull 76.

Referring now to FIG. 7, there is illustrated a sixth embodiment for protective layer 10. However, in this embodiment, protective layer 10 comprises only an adhesive layer 92 which is impregnated with anti-fouling compound 94. As illustrated, plastic film 96 having an inner surface 98 and an outer surface 100 is used to apply adhesive 92 onto outer surface 102 of boat hull 104. As noted, adhesive 92 is impregnated with anti-fouling compound 94. However, plastic film 96 is removable from adhesive 92 after applying the adhesive layer 92 to the outer surface 102 of boat hull 104. Thus, the impregnated adhesive 92 comes into direct contact with the surrounding environment and compound 94 leaches from adhesive 92 to prevent marine growth and/or attachment of marine organisms to hull 104. The adhesive 92 is applied to boat hull 104 in the same manner as the previous embodiments except for the additional step of removing film 96.

Adhesive 92 is removed from outer surface 108 of boat hull 104 by applying a removing laminate over adhesive 92, as shown in FIG. 8. The removing laminate comprises a carrier film 106 having an inner surface 108 and adhesive 110 disposed on the inner surface 108. Adhesive 110 is a thermoplastic or hot melt adhesive of a similar type as adhesive 92. When heated, however, adhesive 110 chemically bonds with adhesive 92 while at the same time substantially destroying or weakening the bond between adhesive 92 and exterior surface 108 of boat hull 104. The bond, however, between carrier film 106 and adhesive 110 remains intact thus allowing adhesive 92 to be separated from exterior surface 102 of boat hull 104.

I claim:

1. An anti-fouling protective layer for preventing attachment of marine organisms to an underwater surface, comprising:
   a plastic film having inner and outer surfaces;
   a thermoplastic adhesive disposed between a structure intended to be submerged underwater and the inner surface of said film, said adhesive upon heating removably adheres said film to said structure; and
   said thermoplastic adhesive impregnated with an anti-fouling compound so that when attached to said structure said anti-fouling compound prevents growth of marine organisms on said plastic film.

2. The protective layer of claim 1 wherein said plastic film is hygroscopic.

3. The protective layer of claim 1 wherein said plastic film is permeable.

4. The protective layer of claim 1 wherein said plastic film is selected from the group consisting of polyethylene, polypropylene and nylon.

5. The protective layer of claim 1 wherein said adhesive is a hot melt adhesive.

6. The protective layer of claim 1 wherein said anti-fouling compound is selected a from the group consisting of capsaicin, capsicum, furan compounds, copper compounds, lactones, alkyl-phenols, organotin compounds, antibiotics and mixtures thereof.

7. The protective layer of claim 1 wherein said structure is a boat hull.

8. The protective layer of claim 1 further including an insulating film disposed between said adhesive and said structure.

9. The protective layer of claim 8 wherein said structure is an aluminum boat hull, and said insulating film comprises polyethylene.

10. The protective layer of claim 1 wherein said plastic film has a melting point higher than the melting point of said adhesive.

11. The protective layer of claim 1 wherein said plastic film is nylon.

12. An anti-fouling protective layer for preventing attachment of marine organisms to an underwater surface, comprising:
- a permeable plastic film having inner and outer surfaces;
- a first thermally sensitive, thermoplastic adhesive disposed on the inner surface of said film and between said inner surface and a structure intended to be submerged underwater, and wherein said first adhesive is impregnated with an anti-fouling compound;
- an insulating layer disposed between said first adhesive and said structure, said insulating layer comprising an insulating film and a second thermally sensitive, thermoplastic adhesive disposed between said insulating film and said structure; and
- said plastic film being permeable to said anti-fouling compound thereby allowing said compound to be slowly released into a surrounding aqueous environment to prevent marine growth on said film.

13. The protective layer of claim 12 wherein said plastic film includes a plurality of openings formed therethrough.

14. The protective layer of claim 12 wherein said plastic film has a melting point higher than the melting point of both said first and second adhesive.

15. The protective layer of claim 12 wherein said plastic film is selected from the group consisting of polyethylene, polypropylene and nylon.

16. The protective layer of claim 12 wherein both said first and second adhesive is a hot melt adhesive.

17. The protective layer of claim 12 wherein said plastic film is nylon.

18. The protective layer of claim 12 wherein said anti-fouling compound is selected from the group consisting of capsaicin, capsicum, farail compounds, copper compounds, lactones, alkyl-phenols, organotin compounds, antibiotics and mixtures thereof.

19. The protective layer of claim 12 wherein said structure is an aluminum boat hull.

20. An anti-fouling protective layer for preventing attachment of marine organisms to an underwater surface, consisting of:
- a thermoplastic adhesive disposed on a structure intended to be submerged underwater, said adhesive upon heating removably adheres itself to said structure; and
- said thermoplastic adhesive being impregnated with an anti-fouling compound dispersed therein so that when attached to said structure said anti-fouling compound prevents growth of marine organisms on said adhesive.

21. The protective layer of claim 20 wherein said adhesive is a hot melt adhesive.

22. The protective layer of claim 20 wherein said anti-fouling compound is selected from the group consisting of capsaicin, capsicum, furan compounds, copper compounds, lactones, alkyl-phenols, organotin compounds, antibiotics and mixtures thereof.

23. The protective layer of claim 20 wherein said structure is a boat hull.

* * * * *